US012798588B2

(12) United States Patent
Hoch et al.

(10) Patent No.: US 12,798,588 B2
(45) Date of Patent: Nov. 17, 2026

(54) OBJECT BASED VEHICLE LOCALIZATION

(71) Applicant: NEC Corporation Of America, Herzlia (IL)

(72) Inventors: Yaacov Hoch, Ramat-Gan (IL); Daniel Bolgar, Tel Aviv (IL); Yoav Badikhi, Rehovot (IL); Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 12 days.

(21) Appl. No.: 19/243,874

(22) Filed: Jun. 20, 2025

(65) Prior Publication Data

US 2025/0313212 A1 Oct. 9, 2025

Related U.S. Application Data

(63) Continuation of application No. 17/974,649, filed on Oct. 27, 2022, now Pat. No. 12,397,799.

(51) Int. Cl.

| | |
|---|---|
| ***G06V 20/00*** | (2022.01) |
| ***B60W 40/02*** | (2006.01) |
| ***G06V 10/764*** | (2022.01) |
| ***G06V 20/56*** | (2022.01) |

(52) U.S. Cl.

CPC ........... *B60W 40/02* (2013.01); *G06V 10/764* (2022.01); *G06V 20/56* (2022.01); *B60W 2420/403* (2013.01); *B60W 2554/20* (2020.02); *B60W 2556/40* (2020.02); *B60W 2556/45* (2020.02)

(58) Field of Classification Search

None

See application file for complete search history.

(56) References Cited

U.S. PATENT DOCUMENTS

| | | | | |
|---|---|---|---|---|
| 8,229,663 | B2 | 7/2012 | Zeng et al. | |
| 8,301,374 | B2 | 10/2012 | Surampudi et al. | |
| 9,965,699 | B2 | 5/2018 | Sorstedt | |
| 11,867,819 | B2 | 1/2024 | Doria et al. | |
| 12,005,925 | B1 | 6/2024 | Gogna et al. | |
| 12,638,549 | B2 * | 5/2026 | Ewert | G01S 7/4052 |

(Continued)

OTHER PUBLICATIONS

Notice of Allowance Dated Apr. 25, 2025 from the US Patent and Trademark Office Re. U.S. Appl. No. 17/974,649. (5 pages).

(Continued)

*Primary Examiner* — James M Mcpherson

(57) ABSTRACT

A method of self-localizing with respect to surrounding objects, comprising obtaining an approximated geolocation of the vehicle, retrieving mapping data comprising a geolocation of one or more stationary objects located in an area surrounding the approximated geolocation, receiving imagery data of a surrounding environment of the vehicle captured by a plurality of distinct imaging sensors deployed in the vehicle, applying one or more trained machine learning models to identify one or more of the stationary objects in the imagery data, computing a relative positioning of the vehicle with respect to one or more of the stationary objects based on an orientation of each of the plurality of imaging sensors with respect to the stationary object(s), computing an absolute positioning of the vehicle based on the relative positioning and the geolocation of the stationary object(s), and outputting the vehicle's absolute positioning.

20 Claims, 2 Drawing Sheets

(56) References Cited

U.S. PATENT DOCUMENTS

| | | | | |
|---|---|---|---|---|
| 12,691,906 | B1 * | 7/2026 | Das | B60W 60/0016 |
| 2010/0253540 | A1 * | 10/2010 | Seder | B60R 1/24 348/148 |
| 2016/0165191 | A1 | 6/2016 | Rasheed et al. | |
| 2019/0310376 | A1 | 10/2019 | Geuens | |
| 2021/0094538 | A1 * | 4/2021 | Beller | B60W 30/09 |
| 2021/0284127 | A1 | 9/2021 | Mckcown et al. | |
| 2021/0300356 | A1 | 9/2021 | Paudel et al. | |
| 2021/0332555 | A1 | 10/2021 | Metzger et al. | |
| 2021/0339738 | A1 | 11/2021 | Lashkari et al. | |
| 2022/0003548 | A1 | 1/2022 | Srinivasan | |
| 2022/0268887 | A1 | 8/2022 | van Meurs | |
| 2022/0317295 | A1 | 10/2022 | Yamashita et al. | |
| 2022/0332311 | A1 | 10/2022 | Kim | |
| 2022/0398827 | A1 | 12/2022 | Lewis | |
| 2023/0024039 | A1 | 1/2023 | Shaughnessy et al. | |
| 2023/0120172 | A1 | 4/2023 | Yoshimatsu et al. | |
| 2023/0221942 | A1 * | 7/2023 | Zhang | G06F 8/65 717/168 |
| 2023/0227024 | A1 * | 7/2023 | Munemura | B60W 30/09 701/26 |
| 2023/0303123 | A1 | 9/2023 | Sadek et al. | |
| 2023/0400327 | A1 | 12/2023 | Streem et al. | |
| 2024/0048853 | A1 * | 2/2024 | Teo | B60Q 1/249 |
| 2024/0078794 | A1 | 3/2024 | Zimmermann et al. | |
| 2024/0095997 | A1 | 3/2024 | Viehauser | |
| 2024/0119739 | A1 | 4/2024 | Yasutomi et al. | |
| 2024/0125604 | A1 * | 4/2024 | Nawaz | G01C 21/30 |
| 2024/0140437 | A1 | 5/2024 | Hoch et al. | |
| 2024/0239356 | A1 | 7/2024 | Chi et al. | |
| 2025/0018933 | A1 * | 1/2025 | Watanabe | B60W 30/06 |

OTHER PUBLICATIONS

Official Action Dated Dec. 20, 2024 from the US Patent and Trademark Office Re. U.S. Appl. No. 17/974,649. (23 pages).

Official Action Dated Jul. 25, 2024 from the US Patent and Trademark Office Re. U.S. Appl. No. 17/974,649. (16 pages).

* cited by examiner

OBJECT BASED VEHICLE LOCALIZATION

RELATED APPLICATION/S

This application is a Continuation of patent application Ser. No. 17/974,649 filed on Oct. 27, 2022. The contents of the above applications are all incorporated by reference as if fully set forth herein in their entirety.

FIELD AND BACKGROUND OF THE INVENTION

The present invention, in some embodiments thereof, relates to localizing vehicles, and, more specifically, but not exclusively, to localizing vehicles based on orientation of a plurality of imaging sensors deployed in each vehicle with respect to known stationary objects detected in the vehicle's environment.

Localization of vehicles is a core element for a plurality of vehicle related systems, applications, and/or capabilities ranging from navigation, through vehicle control to safety and security.

Moreover, dependence and reliance on reliable and accurate vehicle localization has significantly increased with the evolution of automated and/or autonomous vehicles which are controlled by at least partially automated systems which must receive accurate positioning data of the vehicles in order to properly, safely and/or effectively function.

SUMMARY OF THE INVENTION

It is an object of the present invention to provide, methods, systems and software program products for localizing vehicles based on geolocation of known stationary objects detected in the vehicle's environment. The foregoing and other objects are achieved by the features of the independent claims. Further implementation forms are apparent from the dependent claims, the description and the figures.

According to a first aspect of the present invention there is provided a method of self-localizing with respect to surrounding objects, comprising using one or more processors of a vehicle for:

Obtaining an approximated geolocation of the vehicle.

Retrieving mapping data comprising a geolocation of one or more stationary objects located in an area surrounding the approximated geolocation.

Receiving imagery data of a surrounding environment of the vehicle captured by a plurality of distinct imaging sensors deployed in the vehicle.

Applying one or more trained machine learning models to identify the one or more stationary objects in the imagery data.

Computing a relative positioning of the vehicle with respect to the one or more stationary objects based on an orientation of each of the plurality of imaging sensors with respect to the one or more stationary objects.

Computing an absolute positioning of the vehicle based on the relative positioning and the geolocation of the one or more stationary objects.

Outputting the vehicle's absolute positioning.

According to a second aspect of the present invention there is provided a system for self-localizing with respect to surrounding objects, comprising one or more processors of a vehicle configured to execute a code. The code comprising:

Code instructions to obtain an approximated geolocation of the vehicle.

Code instructions to retrieve mapping data comprising a geolocation of one or more stationary object located in an area surrounding the approximated geolocation.

Code instructions to receive imagery data of a surrounding environment of the vehicle captured by a plurality of distinct imaging sensors deployed in the vehicle.

Code instructions to apply one or more trained machine learning model to identify the one or more stationary object in the imagery data.

Code instructions to compute a relative positioning of the vehicle with respect to the one or more stationary object based on an orientation of each of the plurality of imaging sensors with respect to the one or more stationary object.

Code instructions to compute an absolute positioning of the vehicle based on the relative positioning and the geolocation of the one or more stationary object.

Code instructions to output the vehicle's absolute positioning.

In a further implementation form of the first and second aspects, the orientation of each imaging sensor is expressed by a yaw, a pitch, and a roll of the respective imaging sensor with respect to the one or more stationary objects.

In a further implementation form of the first and second aspects, the absolute positioning comprises a geolocation of the vehicle.

In an optional implementation form of the first and second aspects, the absolute positioning further comprises an elevation of the vehicle.

In an optional implementation form of the first and second aspects, the absolute positioning further comprises an orientation of the vehicle.

In an optional implementation form of the first and second aspects, the one or more processors are further configured to compute the absolute positioning of the vehicle by:

Computing a magnitude of one or more physical features relating to one or more of the stationary objects based on analysis of the imagery data captured by one or more of the imaging sensors.

Computing a relative positioning of the one or more imaging sensors with respect to the one or more stationary objects based on the magnitude of the one or more physical features.

Computing the absolute positioning of the vehicle based on the relative positioning of the one or more imaging sensors and the geolocation of the one or more stationary objects.

In an optional implementation form of the first and second aspects, the absolute positioning of the vehicle is updated based on the relative positioning of the vehicle with respect to one or more another stationary objects identified in the imagery data captured by at least some of the plurality imaging sensors.

In a further implementation form of the first and second aspects, a positioning of each of the plurality of imaging sensors is calibrated with respect to the vehicle.

In a further implementation form of the first and second aspects, the surrounding environment comprises one or more members of a group consisting of: an outdoor environment, and/or an indoor environment.

In a further implementation form of the first and second aspects, the one or more stationary objects are members of a group consisting of: an infrastructure element, and/or a structure element.

In a further implementation form of the first and second aspects, the one or more machine learning models are trained to identify the one or more stationary object using a plurality of training samples associating between imagery data depicting the one or more stationary objects and a label of the one or more stationary objects.

In an optional implementation form of the first and second aspects, the one or more stationary objects identified in the imagery data captured by each of the plurality of imaging sensors are correlated based on a probability score computed by the one or more trained machine learning models for the identification of the respective stationary object in the imagery data captured by each imaging sensors.

In an optional implementation form of the first and second aspects, the absolute positioning of the vehicle which dynamically moves is updated based on new imagery data captured by one or more of the plurality of imaging sensors while and/or after the vehicle moves to a different location.

In a further implementation form of the first and second aspects, the approximated geolocation is derived from satellite navigation data captured by one or more satellite navigation sensors deployed in the vehicle.

In a further implementation form of the first and second aspects, the approximated geolocation is computed based on dead reckoning navigation data received from one or more dead reckoning navigation systems of the vehicle.

In a further implementation form of the first and second aspects, the mapping data is locally stored in one or more non-transitory storage medium devices deployed in the vehicle.

In a further implementation form of the first and second aspects, the mapping data is received from one or more remote resources via one or more wireless communication channels established between the vehicle and the one or more remote resources.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according g to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
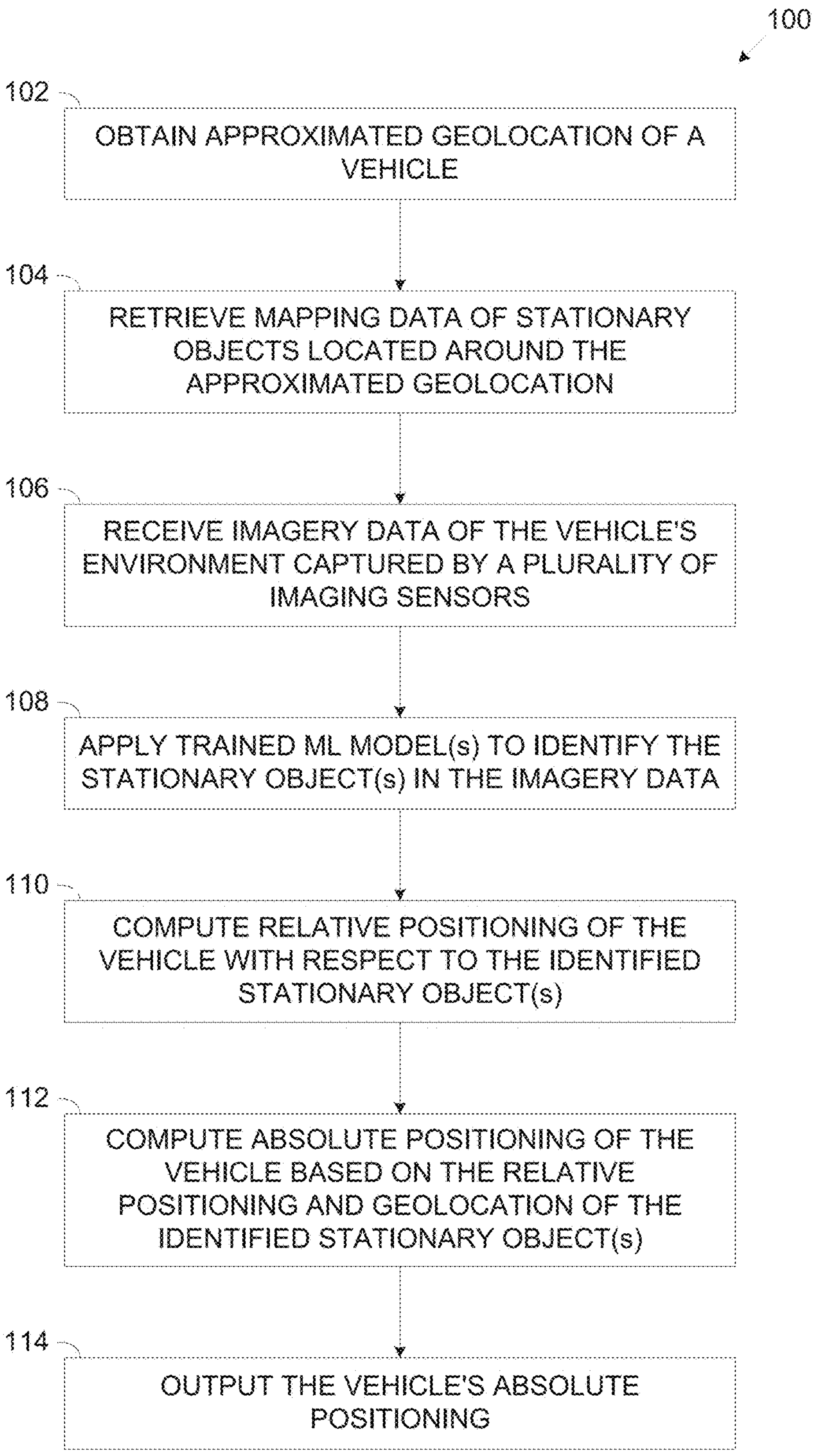
FIG. 1 is a flowchart of an exemplary process of localizing a vehicle based on geolocation of stationary objects detected in a surrounding environment of the vehicle and an orientation of multiple imaging sensors of the vehicle with respect to the stationary objects, according to some embodiments of the present invention.

The present invention, in some embodiments thereof, relates to localizing vehicles, and, more specifically, but not exclusively, to localizing vehicles based on orientation of a plurality of imaging sensors deployed in each vehicle with respect to known stationary objects detected in the vehicle's environment.

According to some embodiments of the present invention, there are provided methods, systems and computer program products for localizing a vehicle based on geolocation of stationary objects detected in a surrounding environment of the vehicle which may be an outdoor and/or an indoor environment, for example, an infrastructure object, a structure object, and/or the like.

In particular, a high-accuracy absolute geolocation of the vehicle may be computed based on the geolocation of one or more surrounding stationary objects identified in imagery data multiple distinct imaging sensors deployed in the vehicle and an orientation of the distinct imaging sensors with respect to the identified stationary object(s).

First, an approximated and typically low-accuracy geolocation of the vehicle may be obtained, for example, based on a satellite navigation data received from one or more satellite navigation systems, for example, Global Positioning System (GPS), GLONASS, Galileo, BeiDou, etc., based on dead reckoning navigation, and/or the like.

Once the approximated geolocation of the vehicle is known, mapping data relating to one or more stationary objects located in an area surrounding the approximated geolocation of the vehicle may be retrieved, for example, a geolocation of the respective stationary object, and/or the like. In particular, the mapping data may associate a label, an identifier, a descriptor and/or the like of a respective stationary object with the geolocation of the respective stationary object. However, mapping data may further comprise additional data relating to one or more stationary objects, for example, descriptive data, imagery data, and/or the like.

The imaging sensors, for example, a camera, a video camera, a thermal camera, an Infrared (IR) camera, a depth camera, a Laser Detection and Ranging (LiDAR) sensor, and/or the like may be deployed in the vehicle to monitor and depict the external environment of the vehicle. Therefore, one or more stationary objects located in the area surrounding the approximated geolocation of the vehicle may be visible at least partially from the vehicle and may be potentially depicted in the imagery data, for example, one or more still pictures, a sequence of video frames, one or more range maps, one or more heat maps, and/or the like captured by one or more of the imaging sensors.

The imagery data captured by at least some (a subset) of the distinct imaging sensors may be analyzed to identify one or more of the surrounding stationary objects and correlate them across the imagery data captured by the subset of imaging sensors. In particular, one or more trained Machine Learning (ML) models, for example, a classifier, a neural network, a Support Vector Machine (SVM), and/or the like may be applied to identify the stationary object(s) in the imagery data captured by the imaging sensors.

The orientation of each imaging sensor of the subset may be computed with respect to one or more of the stationary objects identified in the imagery data and correlated between imaging sensors. The orientation may be expressed using one or more conventions, and/or coordinate systems, for example, a yaw, a pitch, and a roll of the imaging sensor respect to one or more of the stationary objects which may be aligned and/or positioned in a fixed coordinate system.

A relative positioning of the vehicle with respect to the stationary object(s) may be computed based on the orientation of multiple imaging sensors with respect to the stationary object(s) using one or more methods, for example, triangulation, Euclidean geometry, trigonometry, and/or the like.

A highly accurate absolute geolocation of the vehicle may be thus computed based on the relative positioning of the vehicle with respect to the stationary object(s) coupled with the known geolocation of the stationary objects which may be retrieved from the mapping data.

Optionally, the positioning of the vehicle may further comprise one or more additional positioning parameters and/or attributes of the vehicle with respect to the stationary object(s), for example, an elevation, an orientation, and/or the like.

The high-accuracy absolute positioning of the vehicle may output and provide for usage by one or more devices, systems, services, and/or the like for a plurality of applications and/or use cases, for example, navigation, automated and/or autonomous vehicle control, safety, and/or the like.

Localizing vehicles based on the geolocation of surrounding stationary objects may present major benefits and advantages compared to existing vehicle localization methods and systems.

First, most of the existing vehicle localization systems rely solely on satellite navigation data captured by sensors deployed in the vehicle. Due to inherent limitations of the satellite navigation systems, the geolocation derived from the satellite navigation data may be inaccurate and may deviate by several meters or sometime even more form the real geolocation. Moreover, it may be highly difficult and practically impossible to compute additional positioning attributes of the vehicle, for example, an elevation and/or orientation since the satellite navigation data does not comprise data from which such positioning attributes may be derived. Other vehicle localization systems may rely on dead reckoning which, as known in the art, is highly limited in many aspects and is therefore unreliable and used only for special use cases and/or in combination with one or more other localization systems.

Localizing vehicles based on the geolocation of their surrounding stationary objects may overcome these limitations. First, since it relies on stationary objects having a highly accurate geolocation measured objectively using high accuracy means, the stationary object based localization may significantly increase accuracy of the geolocation computed for the vehicles. Moreover, since the localization is based in imagery data captured by imaging sensors deployed in the vehicle, additional positioning attributes of the vehicles, for example, an elevation and/or orientation may be computed based on visual data in which the actual positioning of the vehicle may be accurately identified.

Moreover, some of the existing object based vehicle localization systems may compute the geolocation of a vehicle based on a distance of the vehicle to one or more objects located around the vehicle and captured by imaging sensors deployed in the vehicle. This approach may be prone to inaccuracies and/or failures since in some cases, for example, when the vehicle is oriented with respect to the object such that only a small part of object may be visible, it may be highly difficult to accurately identify the objects in the imagery data, let alone accurately determine the (pixel) distance to them. The vehicle localizing method disclosed herein, on the other hand, relies on detecting the stationary objects by a plurality of distinct imaging sensors and computing the relative positioning of the vehicle based on the orientation of the multiple imaging sensors with respect to the stationary object(s). As such, the vehicle localizing method disclosed herein may significantly increase the localization accuracy since it relies only on view angle (direction) to the stationary object(s) with no regard of the distance and is thus completely oblivious to the orientation of any of the vehicle's imaging sensors with respect to any stationary object.

Furthermore, some of the existing object based vehicle localization systems may rely on detection and identification of objects which are subject to frequent change, for example, road markings, road signs, buildings facades, and/or the like. Due to the frequent visual change of such object, the imagery data used by these existing object based vehicle localization systems to identify the objects must be updated accordingly which may significantly increase complexity, effort, and/or cost. For example, assuming one or more of the existing object based vehicle localization systems employ ML models to identify the objects. In such case the objects may need to be frequently photographed to keep-up with their changes and the ML models may need to be frequently re-trained in order to adapt and learn the changed visual features of the objects. This effort may significantly increase cost, computing resources, and/or time. in contrast, the vehicle localizing method disclosed herein relies on detection of stationary objects, specifically infrastructural and/or structural objects which are not subject to frequent change. It may be therefore unnecessary to frequently train the ML model(s) used to identify and classify the objects detected in the imagery data captured by the imaging sensors thus significantly reducing effort, cost, computing resources, and/or time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of localizing a vehicle based on geolocation of stationary objects detected in a surrounding environment of the vehicle and an orientation of multiple distinct imaging sensors of the vehicle with respect to the stationary objects, according to some embodiments of the present invention.

An exemplary process 100 may be executed to localize a vehicle, i.e., compute positioning of the vehicle, for example, a geolocation based on the geolocation of one or more stationary objects, for example, an infrastructure object, a structure object, and/or the like identified in a surrounding environment of the vehicle.

In particular, the positioning of the vehicle may be computed based on the geolocation of the stationary object(s) and an orientation of each of a plurality of distinct imaging sensors deployed in the vehicle with respect to the identified stationary object(s).

First, an approximated geolocation of the vehicle may be obtained, for example, based on satellite navigation data, based on dead reckoning navigation, and/or the like.

Mapping data relating to one or more stationary objects located in an area surrounding the approximated geolocation of the vehicle may be then retrieved, for example, a geolocation of the respective stationary object.

At least a subset of the plurality of imaging sensors may capture imagery data comprising, for example, one or more still pictures, a sequence of video frames, one or more range maps, one or more heat maps, and/or the like, collectively designated images which may be analyzed to identify one or more stationary objects and correlate them across the imagery data captured by the multitude of imaging sensors. In particular, one or more trained ML models may be applied to identify the stationary object(s) in the imagery data captured by the imaging sensors.

The orientation of each of the subset of imaging sensors with respect to one or more of the correlated stationary objects, for example, a yaw, a pitch, and a roll may be computed based on the location of the stationary object(s), One or more methods known in the art may be applied to compute a relative positioning of the vehicle with respect to the stationary object(s) based on the orientation of multiple imaging sensors with respect to the stationary object(s).

A highly accurate absolute geolocation of the vehicle may be computed based on the relative positioning of the vehicle coupled with the known geolocation of the identified stationary objects which may be retrieved from the mapping data.

Optionally, the positioning of the vehicle may further comprise one or more additional positioning parameters and/or attributes of the vehicle with respect to the stationary object(s), for example, an elevation, an orientation, and/or the like.

Figure 2:
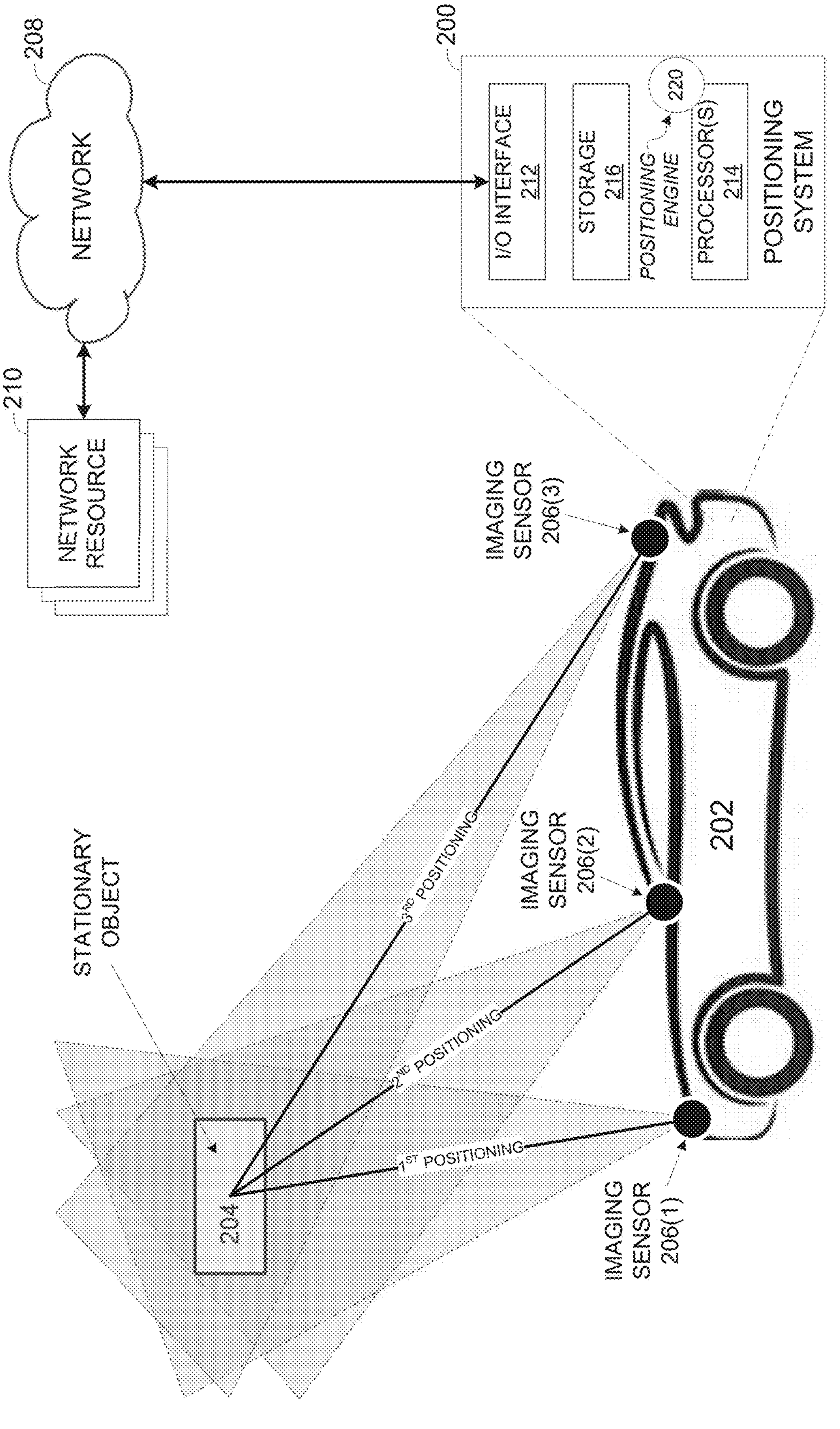
FIG. 2 is a schematic illustration of an exemplary system for localizing a vehicle based on geolocation of stationary objects detected in a surrounding environment of the vehicle and an orientation of multiple imaging sensors of the vehicle with respect to the stationary objects, according to some embodiments of the present invention.

Reference is also made to FIG. 2, which is a schematic illustration of an exemplary system for localizing a vehicle based on geolocation of stationary objects detected in a surrounding environment of the vehicle and an orientation of multiple imaging sensors of the vehicle with respect to the stationary objects, according to some embodiments of the present invention.

A positioning system 200, for example, an ECU, a computer, a controller, a computing node and/or another processing device may be deployed in each of one or more vehicles 202 to execute the process 100 for self-localizing the respective vehicle 202 and computing its accurate positioning based on the geolocation of one or more stationary objects 204 identified in a surrounding environment of the respective vehicle 202 which may be an outdoor environment, an indoor environment and/or a combination thereof.

The vehicles 202 may typically comprise ground vehicles, for example, a car, a bus, a truck, a motorcycle, a bicycle, a robot, and/or the like. However, the vehicles 202 may comprise one or more aerial vehicles, for example, a drone, and/or the like. Moreover, in some scenarios, the vehicles 202 may be naval vehicle, for example, a boat, a hovercraft and/or the like.

A plurality of imaging sensors 206, for example, a camera, a video camera, a thermal camera, an Infrared (IR) camera, a depth camera, a Laser Detection and Ranging (LiDAR) sensor, and/or the like may be deployed in the vehicle 202, for example, mounted, attached, integrated and/or otherwise coupled to the vehicle 202.

The imaging sensors 206 may be deployed such that each of the imaging sensors 206 may depict at least a portion of the external environment surrounding the vehicle 202. Each of the imaging sensors 206 may therefore capture and/or generate imagery data of the external environment of the vehicle 202, for example, one or more still pictures, a sequence of video frames, one or more range maps, one or more heat maps, and/or the like designated images herein after.

In particular, the imaging sensors 206 may be distinct from each other such that at least some of the plurality of imaging sensors 206 are deployed separately from each other in different locations and/or parts of the vehicle 202 thus having different positioning with respect to objects surrounding the vehicle 202.

One or more of the imaging sensor(s) 206 may be specifically deployed to support the positioning system 200 for executing the process 100. However, the positioning system 200 may take advantage of one or more imaging sensors 206 which are already deployed in the vehicle 202 to support one or more other applications and/or objectives, for example, automated driving, safety, navigation, and/or the like.

The imaging sensors 206 depicting the surrounding environment of the vehicle 202 may therefore capture imagery data of one or more of the stationary objects 204 located around the vehicle 202 which visible, noticeable, and/or notable while typically not subject to frequent change, for example, an infrastructure element, a structure element, and/or the like. The type of the stationary objects 204 may naturally depend on the surrounding environment of the vehicle 202.

For example, assuming the surrounding environment is an outdoor environment, the stationary objects 204 may comprise, for example, one or more traffic related infrastructural elements such as, for example, a traffic light, a traffic sign, a lamp pole, a crossroad, an intersection, and/or the like. In another outdoor environment stationary objects 204 may comprise one or more structural elements, for example, a monument, a building, a bridge, a tunnel, and/or the like. In another example, assuming the surrounding environment is an indoor environment, the stationary objects 204 may comprise, for example, one or more infrastructural and/or structural elements, for example, a door, a window, a lamp, a notable structural feature (e.g., room corner, staircase, etc.), and/or the like.

The vehicle 202 may dynamically move between one or more different locations. The imagery data captured by the imaging sensors 206 may therefore depict one or stationary objects 204 which are not depicted (seen) in in imagery data captured previously by one or more of the imaging sensors 206. Moreover, since the vehicle 202 may dynamically move, the imagery data captured by the imaging sensors 206 may depict one or more stationary objects 204 which are depicted in previously captured imagery data. However, since the vehicle 202 moves to a different location, the positioning of the one or more of the imaging sensors 206, for example, a view angle, a distance, an elevation, a rotation, and/or the like may change with respect to the stationary objects 204 depicted in the previously captured imagery data.

Since the distinct imaging sensors 206 are deployed separately from each other in the vehicle 202 each of the distinct imaging sensors 206 may therefore have an at least slightly different positioning (compared to other imaging sensors 206) with respect to one or more common stationary objects 204 depicted in the imagery data captured by at least some of the distinct imaging sensors 206. For example, a seen in FIG. 2, a first imaging sensor 206(1) deployed in a front section of the vehicle 202 may have a first positioning with respect to a certain stationary object 204 located in view of the vehicle 202 while a second imaging sensor 206(2) deployed in a middle section of the vehicle 202 may have a second positioning with respect to the certain stationary object 204 and a third imaging sensor 206(3) deployed in a rear section of the vehicle 202 may have a third positioning with respect to the certain stationary object 204.

It should be noted, that while the FIG. 2 illustrates three imaging sensor 206, it should not be construed as limiting since any number N (N>1) of imaging sensors 206 may be deployed in the vehicle 202 to support localization and positioning of the vehicle 202.

Each of the imaging sensors 206 may be calibrated with respect to the vehicle 202, in particular with respect to one or more common reference points, elements, and/or planes of the vehicle 202 (collectively designated reference points), for example, a center point, a center of mass, a front plane, a driver seat, a front windshield, and/or the like.

It should be noted that the deployment of the imaging sensors 206 demonstrated in FIG. 2 is exemplary and should not be construed as limiting since a different number of imaging sensors 206 may be deployed in one or more other sections of the vehicle 202.

The positioning system 200 deployed in the vehicle 202 may include an Input/Output (I/O) interface 212 for communicating with one or more imaging sensors 206, a processor(s) 214 for executing the process 100 and a storage 216 for storing code (program store) and/or data.

The I/O interface 212 may include one or more wired and/or wireless interfaces, for example, a Controller Area Network (CAN) Bus interface, a Universal Serial Bus (USB) interface, a serial interface, a Radio Frequency (RF) interface, a Bluetooth interface and/or the like. Via the I/O interface 212, the positioning system 200 may communicate with one or more other devices, sensors, units, and/or systems deployed in the vehicle 202, for example, one or more of the imaging sensors 206.

The I/O interface 212 may further include one or more network and/or communication interfaces for connecting to a network 208 comprising one or more wired and/or wireless networks, for example, a Local Area Network (LAN), a Wide Area Network (WAN), a Metropolitan Area Network (MAN), a Wireless LAN (WLAN), a cellular network, the internet and/or the like. Via the I/O interface 212, the positioning system 200 may therefore communicate over the network 208 with more or more remote network resources 210 connected to the network 208, for example, a server, a storage server, a database, a cloud service a cloud platform and/or the like. For example, the I/O interface 212 may comprise one or more interfaces for connecting to one or more wireless networks and/or communication channels through which the positioning system 200 may therefore communicate with the remote network resource(s) 210 while the vehicle 202 is not physically connected to any wired infrastructure, for example, while travelling. In another example, the I/O interface 212 may comprise one or more interfaces for connecting to one or more wired networks and/or communication channels via one or more wired cables, ports, outlets and/or the like to which the vehicle 202 may be connected while static, for example, parked, undergoing maintenance and/or repair, and/or the like.

The processor(s) 214, homogenous or heterogeneous, may include one or more processors and/or controllers arranged for parallel processing, as clusters and/or as one or more multi core processor(s). The storage 216 may include one or more non-transitory persistent storage devices, for example, a Read Only Memory (ROM), a Flash array, a hard drive and/or the like. The storage 216 may also include one or more volatile devices, for example, a Random Access Memory (RAM) component, a cache memory and/or the like.

The processor(s) 214 may execute one or more software modules such as, for example, a process, a script, an application, an agent, a utility, a tool, an Operating System (OS), a service, a plug-in, an add-on and/or the like each comprising a plurality of program instructions stored in a non-transitory medium (program store) such as the storage 216 and executed by one or more processors such as the processor(s) 214.

The processor(s) 212 may optionally integrate, utilize and/or facilitate one or more hardware elements (modules) integrated, utilized and/or otherwise available in the positioning system 200, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU), an Artificial Intelligence (AI) accelerator and/or the like.

The processor(s) 214 may therefore execute one or more functional modules implemented using one or more software modules, one or more of the hardware modules and/or combination thereof, for example, a positioning engine 220 configured to execute the process 100 for localizing and positioning the vehicle 202.

Optionally rather than deployed as an independent unit, the positioning system 200 may be utilized, implemented and/or integrated in one or more existing control units and/or systems, for example, an ECU, and/or the like which are already deployed in the vehicle 202 for one or more other applications, for example, drive control, mission control, data analysis, navigation, communications, infotainment, and/or the like such that the positioning engine 220 is executed by the existing control unit(s).

As shown at 102, the process 100 starts with the positioning engine 220 obtaining an approximated geolocation of the vehicle 202.

The positioning engine 220 may obtain the approximated geolocation from one or more devices, sensors, systems, and/or services. For example, the positioning engine 220 may receive and/or derive the approximated geolocation of the vehicle 202 from satellite navigation data received from one or more sensors deployed in the vehicle 202 which are configured to intercept satellite navigation signals of one or more satellite navigation systems, for example, GPS, GLONASS, Galileo, BeiDou, and/or the like. In another example, the positioning engine 220 may compute, derive, extract and/or receive the approximated geolocation of the vehicle 202 based on dead reckoning navigation data received from one or more dead reckoning navigation systems of the vehicle 202. Such dead reckoning navigation system(s) may compute the approximated geolocation of the vehicle 202 based on motion data measured by one or more motion sensors deployed in the vehicle 202, for example, a gyroscope, an accelerometer, a speedometer, and/or the like. In another example, the positioning engine 220 may receive the approximated geolocation of the vehicle 202 from one or more remote network resources 210. For example, the positioning engine 220 may communicate, via the network 208, with a tracking system configured to track the vehicle 202 and compute its approximated geolocation.

As shown at 104, the positioning engine 220 may retrieve mapping data relating to one or more stationary objects 204 located in an area surrounding the approximated geolocation of the vehicle 202 and are therefore potentially at least partially visible from the vehicle 202.

The mapping data may comprise (record) at least a geolocation of one or more stationary objects 204 located around the approximated geolocation of the vehicle 202. In particular, the mapping data may correlate an identifier, a descriptor, and/or label of each recorded stationary object 204 with the geolocation of the respective stationary object 204. Optionally, the mapping data may further comprise imagery data of one or more of the recorded stationary objects 204, for example, an image, and/or the like.

The positioning engine 220 may retrieve the mapping data from one or more sources. For example, the mapping data and/or part thereof may be locally stored in one or more non-transitory storage mediums deployed in the vehicle 202, for example, the storage 216. In such case, the positioning engine 220 may access the local storage 216 and retrieve the mapping data. In another example, the mapping data and/or part thereof may be stored in one or more remote network resources 210, for example, a stargaze server, a mapping online service, a cloud platform, and/or the like accessible via the network 208. In such case, the positioning engine 220 may communicate with the remote network resource(s) 210 via one or more wireless communication channels and/or networks to receive the mapping data.

The positioning engine 220 may determine which stationary objects 204 are located in the surrounding area of the vehicle 202 by comparing between their geolocation data, extracted from the mapping data, and the approximated geolocation of the vehicle 202.

As shown at 106, the positioning engine 220 may receive imagery data captured by at least some of the plurality of imaging sensors 206 deployed in the vehicle 202 to monitor the external environment surrounding the vehicle 202 and capture imagery data depicting this environment.

As described herein before, the imagery data captured by the imaging sensors 206 may depend on the type, technology, capabilities, and/or operational parameters of the imaging sensors 206 and may comprise, for example, one or more still pictures, a sequence of video frames, one or more range maps, one or more heat maps, and/or the like collectively designated images herein after.

Since the stationary objects 204 which are located in the area of the approximated geolocation of the vehicle 202, one or more of these stationary objects 204 may be visible at least partially from the vehicle 202 and may be therefore potentially depicted in the imagery data captured by one or more of the imaging sensors 206.

As shown at 108, the positioning engine 220 may apply one or more trained ML models, for example, a classifier, a neural network, an SVM, and/or the like to analyze the imagery data captured by the imaging sensors 206 and identify one or more of the stationary objects 204 located in the surrounding area of the vehicle 202 which and thus potentially depicted in the imagery data.

The ML model(s) may be trained to detect objects in imagery data, estimate and/or predict whether each detected objects corresponds to one of the stationary objects 204 and classify the detected object accordingly, i.e., assign a label, for example, an identifier, a descriptor, and/or the like to the respective stationary object 204.

The ML model(s) may be trained to identify the stationary objects 204 in one or more supervised, unsupervised, and/or semi-supervised learning sessions using a plurality of training samples comprising imagery data of the stationary objects 204. For example, one or more of the ML model(s) may be trained in one or more supervised training sessions using labeled training samples associating (correlating) imagery data (images) of one or more of the stationary objects 204 with a respective label of the respective stationary object 204. In such case, the ML model(s) may adjust, evolve, and learn to classify imagery data of the stationary objects 204 to their respective labels. In another example, one or more of the ML model(s) may be trained in one or more unsupervised training sessions using unlabeled training samples comprising imagery data of one or more of the stationary objects 204. In such case, the ML model(s) may adjust, evolve, and learn to classify the stationary objects 204 to a plurality of classes and/or clusters each representative of a respective stationary object 204. In another example, one or more of the ML model(s) may be trained in one or more semi-supervised training sessions using a combination of labeled and unlabeled training samples.

The ML model(s) may be trained using real-world and/or simulated imagery data (images) of the stationary objects 204. Optionally, one or more additional training samples may be created for training the ML model(s) by augmenting the imagery data, i.e., the images of one or more other training samples. The images may be augmented using one or more transformations, for example, rotation, mirroring, displacement, visual augmentation (e.g., brightness, contrast, color, etc.), and/or the like. this may serve to expand and enhance the training dataset which may improve identification and/or classification performance of the ML model(s), for example, accuracy, reliability, consistency, and/or the like.

The ML model(s) may further compute a probability score for each identified stationary object 204 which indicates a probability (confidence) of correct identification and classification estimated by the ML model(s) for the respective stationary object 204, i.e., the probability of correct label, identifier, descriptor, etc. assigned to the respective stationary object 204. In particular, since the ML model(s) are applied to analyze the imagery data captured by multiple imaging sensors 206, the ML model(s) may compute a respective probability score for each stationary object 204 identified in the imagery data captured by each of the multiple imaging sensors 206.

The ML model(s) may further output a bounding box associated with each detected and classified stationary object 204 which may bound the respective stationary object 204 in the image(s) such that the bounding box encompasses a region of pixels in the image occupied by the respective stationary object 204. Again, since the ML model(s) are applied to analyze the imagery data captured by multiple imaging sensors 206, the ML model(s) may output a respective bounding box for each stationary object 204 identified in the imagery data captured by each of the multiple imaging sensors 206.

As shown at 110, the positioning engine 220 may compute a relative positioning of the vehicle 202 with respect to one or more of the stationary objects 204 identified in the surrounding environment of the vehicle 202.

In particular, the positioning engine 220 may compute the relative positioning of the vehicle 202 based on the orientation of each of at least some of the imaging sensors 206 with respect to one or more of the identified stationary objects 204.

The orientation of each imaging sensor 206 may comprise, for example, a view angle, an elevation, a rotation, and/or the like which may be expressed in one or more coordination systems, for example, Euler angles describing the orientation of each imaging sensor 206 with respect to a fixed coordinate system. In such case, the positioning engine 220 may compute the orientation of each imaging sensor 206 in terms of a yaw (angle), a pitch (angle), and a roll (angle) with respect to identified stationary object(s) 204 which may be aligned and positioned in a common fixed coordinate system, for example, a geographical grid.

Since all imaging sensors 206 are calibrated, the positioning of the imaging sensors 206 with respect to the reference point(s) is known and the positioning engine 220 may establish fixed coordinate system and align all of the imaging sensors 206 with respect to this fixed coordinate system.

However, in order to accurately compute the relative positioning of the vehicle 202, the relative orientation of the imaging sensors 206 must be computed with respect to the same stationary object(s) 204. The positioning engine 220 may therefore first correlate between the stationary object(s) 204 detected in the imagery data captured by each of the imaging sensors 206 to ensure that the same stationary object(s) 204 is addressed in the imagery data of all imaging sensors 206 and used accordingly for the computation of the vehicle's relative positioning.

The positioning engine 220 may apply one or more methods, techniques, and/or algorithms to correlate between same stationary objects 204 identified in imagery data captured by multiple imaging sensors 206. For example, the positioning engine 220 may correlate the same stationary object 204 identified in the imagery data generated by multiple imaging sensors 206 based on the probability score computed by the trained ML model(s) for the identification and classification of the respective stationary object 204 in the imagery data captured by each imaging sensors 206. For example, assuming the ML model(s) identifies with high probability (score) a certain stationary object 204, for example, a certain 4-direction traffic light in each imagery data captured by each of multiple imaging sensors 206. In such case, the positioning engine 220 may estimate, and/or determine with high probability that the same 4-direction traffic light is identified and classified accordingly for all of the imaging sensors 206.

In another example, the positioning engine 220 may correlate the same stationary object 204 identified in the imagery data generated by multiple imaging sensors 206 based on the descriptor estimated by the ML model(s) for the one or more stationary objects 204 detected in the imagery data captured by multiple imaging sensors 206. The descriptor may provide additional information relating to the respective stationary object 204, for example, a mark, a text, and/or the like associated with the respective stationary object 204 which may be used by the positioning engine 220 to correlate the same stationary object 204.

The positioning engine 220 may apply one or more methods, algorithms and/or computations to compute the relative positioning of the vehicle 202 with respect to one or more of the identified stationary objects 204 based on the orientation of the imaging sensors 206 with respect to these stationary objects 204. For example, the positioning engine 220 may apply one or more triangulation algorithms to compute the relative positioning of the vehicle 202 based on the orientation of three or more of the imaging sensors 206 with respect to these stationary objects 204. In another example, the positioning engine 220 may apply one or more Euclidean geometry computations to compute the relative positioning of the vehicle 202 based on the orientation of at least some of the imaging sensors 206 with respect to these stationary objects 204. In another example, the positioning engine 220 may apply one or more trigonometric computations to compute the relative positioning of the vehicle 202 based on the orientation of at least some of the imaging sensors 206 with respect to these stationary objects 204.

Optionally, the positioning engine 220 may compute the absolute positioning of the vehicle 202 based on one or more physical features relating to one or more of the stationary objects 204 identified in the imagery data captured by one or more of the imaging sensors 206. The positioning engine 220 may compute the absolute positioning of the vehicle 202 based on a magnitude of one or more of the physical features identified and computed accordingly based on analysis of the in the imagery data.

The physical features may comprise, for example, one or more faces, walls, sections, and/or the like of one or more stationary objects 204 identified in the imagery data and the magnitude may express dimensions of these physical features, for example, a height, a width, a depth, and/or the like. In another example, the magnitude may express one or more proportion ratios between one or more physical features. In another example, the physical features may comprise a gap between two or more stationary objects 204 identified in the imagery data and the magnitude may the distance between the stationary objects 204.

The positioning engine 220 may compute a relative positioning of each of one or more of the imaging sensors 206 with respect to one or more of the stationary objects 204 identified in their imagery data based on the computed magnitude of one or more of the physical features relating to one or more of the identified stationary objects 204 compared to the actual real-world magnitude of the respective physical features.

In particular, the positioning engine 220 may compute the relative positioning of a respective imaging sensor 206 with respect to a respective stationary object 204 identified in its imagery data based on the computed magnitude of one or more of the physical features relating to the respective stationary objects 204 compared to an actual (real-world) magnitude of these respective physical features. The actual magnitude of one or more of the physical features may be extracted, for example, from the mapping data of the respective stationary objects 204. In another example, the actual magnitude of one or more of the physical features may be standard, common knowledge, and/or predefined and may be received from one or more remote network resources 210 and/or retrieved from a local storage such as the storage 216 storing the magnitude of one or more of the physical features relating to one or more of the stationary objects 204.

The positioning engine 220 may compute the magnitude of one or more of the physical features in the imagery data, as known in the art, based on one or more operational parameters and/or attributes of the respective imaging sensor 206, for example, a sensor size expressed in pixel and/or mm dimensions, a focal length, and/or the like.

For example, assuming the ML model(s) created a bounding box, for a certain stationary object 204, for example, a traffic light identified in the imagery data captured by a certain imaging sensor 206. In such case, the positioning engine 220 may compute a magnitude of one or more dimensions of the bounding box, for example, a height and/or a width. The positioning engine 220 may then compute a ratio between the dimension computed for the bounding box, for example, the height of the bounding box and the actual real-world height of the traffic light.

Using the ratio between the magnitude computed for the physical feature(s) in the imagery data and the actual real-world magnitude of the corresponding physical feature(s), the positioning engine 220 may compute a distance of the respective imaging sensor 206 to the respective stationary object 204 based on a distance between the respective imaging sensor 206 and the respective stationary object 204 in the imagery data. The positioning engine 220 may further compute a view angle (heading) of the respective imaging sensor 206 to the respective stationary object 204.

The positioning engine 220 may then compute the relative positioning of the respective imaging sensor 206 with respect to the respective stationary object 204 which may be expressed by a vector comprising the distance and the heading (view angle) of the respective imaging sensor 206 to the respective stationary object 204.

The positioning engine 220 may then compute the absolute positioning of the vehicle based on the relative positioning of the at least one imaging sensor 206, i.e., its vector to the respective stationary object 204 and the geolocation of the to the respective stationary object 204.

The relative positioning of the vehicle 202 with respect to one or more of the identified stationary objects 204 may comprise, for example, a distance, a direction (view angle), an elevation, a rotation, an orientation, and/or the like.

As shown at 112, the positioning engine 220 may compute an absolute positioning of the vehicle 202 based on the relative positioning of the vehicle 202 with respect to one or more of the identified stationary objects 204 and the geolocation of these identified stationary objects 204 extracted from the mapping data.

In particular, the absolute positioning computed for the vehicle 202 by the positioning engine 220 may comprise, a geolocation of the vehicle 202.

Optionally, the absolute positioning of the vehicle 202 may further comprise an elevation of the vehicle 202, for example, an absolute elevation, an elevation with respect to one or more of the stationary objects 204, and/or a combination thereof.

Optionally, the absolute positioning of the vehicle 202 may also comprise an orientation of the vehicle 202, for example, an absolute orientation which may be expressed by an absolute value (degrees, north/east/south/west, etc.), an orientation with respect to one or more of the stationary objects 204, and/or a combination thereof.

While the positioning engine 220 may compute the absolute positioning of the vehicle 202 based on its relative positioning with respect to a single stationary object 204, the positioning engine 220 may compute, adjust, and/or update the absolute location of the vehicle 202 based on the relative positioning of the vehicle 202 with respect one or more additional (other) stationary objects 204 identified in the imagery data captured by at least some of the imaging sensors 206.

Moreover, since the vehicle 202 may dynamically move, the positioning engine 220 may update the absolute positioning of the vehicle 202 based on new imagery data captured by one or more of the imaging sensors 206 while and/or after the vehicle 202 moves to a different location.

The new imagery data may depict one or more stationary objects 204 already depicted and potentially identified in imagery data previously captured by one or more of the imaging sensors 206. However, since the vehicle 202 changed its location, the orientation and/or positioning of the imaging sensors 206 with respect to such previously identified stationary objects 204 may change. The positioning engine 220 may therefore re-compute and/or update the relative positioning of the vehicle 202 with respect to the previously identified stationary objects 204 and further re-compute and/or update the absolute positioning of the vehicle 202 based on its updated relative positioning.

The new imagery data may depict one or more stationary objects 204 which are not depicted in imagery data previously captured by one or more of the imaging sensors 206. The positioning engine 220 may thus compute the relative positioning of the vehicle 202 with respect to the previously unseen stationary objects 204 and re-compute and/or update the absolute positioning of the vehicle 202 based on its relative positioning.

As shown at 114, the positioning engine 220 may output the absolute positioning computed for the vehicle 202 which may be highly accurate, reliable, and/or consistent compared to other localization methods.

The high-accuracy absolute positioning of the vehicle 202 may be used by one or more devices, systems, services, and/or the like for a plurality of applications and/or use cases. For example, the highly accurate absolute positioning of the vehicle 202 may be provided to one or more navigation systems deployed in the vehicle 202 to enhance their navigation performance and/or to improve navigation instructions they present to the driver. In another example, the absolute positioning of the vehicle 202 may be provided to one or more automated and/or autonomous drive control systems, for example, Advanced Driver-Assistance System (ADAS), and/or the like configured to control, at least partially automatically, operation and/or movement of the vehicle 202, for example, acceleration, deceleration, steering, breaking, lane control, and/or the like. Such automated control systems may use the highly-accurate absolute positioning of the vehicle 202 to improve control of the vehicle 202, for example, increase accuracy of turns, increase accuracy of distance evaluation, and/or the like.

Moreover, a plurality of positioning systems 200 may be deployed in a plurality of vehicles 202 such that a respective instance of the positioning engine 220 may be executed in each of the vehicles 202 to compute their absolute positioning with high accuracy. The vehicles 202 may communicate with each other via one or more vehicle communication channels as known in the art to exchange their absolute positioning. The automated control system(s) deployed in one or more of the vehicles 202 may therefore further improve their control over the vehicles 202 with respect to one or more other vehicles 202 based on the highly-accurate absolute positioning of these other vehicle 202.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms vehicle, imaging sensor technology, and machine learning model are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of self-localizing a mobile platform with respect to surrounding environment, comprising:

capturing, by a plurality of sensing devices deployed in a mobile platform, sensor data of a surrounding environment of said mobile platform;

obtaining, by at least one processor deployed in said mobile platform, the sensor data;

obtaining, by the at least one processor, from at least one positioning system deployed in said mobile platform an approximated geolocation of the mobile platform;

obtaining, by the at least one processor, mapping data comprising a geolocation of at least one reference object located in an area surrounding the approximated geolocation;

using at least one trained machine learning model to identify the at least one reference object in the sensor data;

computing at least one magnitude of at least one physical feature relating to the at least one reference object;

computing a relative positioning of each of the plurality of sensing devices with respect to the at least one reference object based on the at least one magnitude of the at least one physical feature;

computing a high-accuracy absolute positioning of the mobile platform based on relative positioning of each of the plurality of sensing devices and the geolocation of at least one reference object, wherein said absolute positioning is a geolocation of said mobile platform including an elevation of the mobile platform, with an accuracy higher than said approximated geolocation of said mobile platform; and outputting the high-accuracy absolute positioning of the mobile platform to at least one device deployed in said mobile platform for navigation and/or autonomous control of said mobile platform.

2. The method of claim 1, wherein the absolute positioning further comprises an orientation of the mobile platform.

3. The method of claim 1, wherein the at least one magnitude of the at least one physical feature comprises at least one of a height, a width, and a depth.

4. The method of claim 1, wherein
the at least one physical feature comprises a first physical feature and a second physical feature relating to the at least one reference object, and
the at least one magnitude comprises one or more proportion ratios between the first physical feature and the second physical feature.

5. The method of claim 1, wherein
the at least one reference object comprises a first reference object and a second reference object,
the at least one physical feature comprises a gap between the first reference object and the second reference object, and
the at least one magnitude comprises a distance between the first reference object and the second reference object.

6. The method of claim 1, wherein computing a relative positioning of each of the plurality of sensing devices with respect to the at least one reference object comprises comparing the at least one magnitude of the at least one physical feature to at least one respective real-world magnitude of the at least one physical feature.

7. The method of claim 6, further comprising extracting the at least one respective real-world magnitude of the at least one physical feature from the mapping data.

8. The method of claim 6, further comprising retrieving the at least one respective real-world magnitude of the at least one physical feature from at least one non-transitory storage medium deployed in the mobile platform.

9. The method of claim 6, further comprising receiving the at least one respective real-world magnitude of the at least one physical feature from at least one remote resource via at least one wireless communication channel established between the mobile platform and the at least one remote resource.

10. The method of claim 6, wherein the at least one magnitude of the at least one physical feature comprises at least one dimension of a bounding box of the at least one physical feature.

11. The method of claim 6, wherein comparing the at least one magnitude of the at least one physical feature to at least one respective real-world magnitude of the at least one physical feature comprises computing at least one ratio of the at least one magnitude and the at least one respective real-world magnitude.

12. The method of claim 1, further comprising computing at least one heading angle of at least one sensing device in the plurality of sensing devices to the at least one reference object.

13. The method of claim 1, wherein obtaining the mapping data comprises retrieving the mapping data from at least one non-transitory storage medium deployed in the mobile platform.

14. The method of claim 1, wherein obtaining the mapping data comprises receiving the mapping data from at least one remote resource via at least one wireless communication channel established between the mobile platform and the at least one remote resource.

15. The method of claim 1, wherein the absolute positioning further comprises an orientation of the mobile platform.

16. The method of claim 1, further comprising updating the absolute positioning of the mobile platform based on the relative positioning of the mobile platform with respect to at least one another stationary object identified in the sensor data captured by at least some of the plurality sensing devices.

17. The method of claim 1, wherein the at least one stationary object is a member of a group consisting of: an infrastructure element, and a structure element.

18. The method of claim 1, wherein the at least one machine learning model is trained to identify the at least one stationary object using a plurality of training samples associating between sensor data depicting the at least one stationary object and a label of the at least one stationary object.

19. The method of claim 1, further comprising correlating the at least one stationary object identified in the sensor data captured by each of the plurality of sensing devices based on a probability score computed by the at least one trained machine learning model for the identification of the respective at least one stationary object in the sensor data captured by each sensing device.

20. A system for self-localizing a mobile platform with respect to surrounding environment, comprising:
a plurality of sensing devices;
at least one positioning system; and
at least one processor configured to execute a method of self-localizing a mobile platform with respect to surrounding environment, the method comprising:
obtaining, by the at least one processor, from the plurality of sensing devices, sensor data of a surrounding environment of the mobile platform;
obtaining, by the at least one processor, from the at least one positioning system an approximated geolocation of the mobile platform;
obtaining, by the at least one processor, mapping data comprising a geolocation of at least one reference object located in an area surrounding the approximated geolocation;
using at least one trained machine learning model to identify the at least one reference object in the sensor data;
computing at least one magnitude of at least one physical feature relating to the at least one reference object;
computing a relative positioning of each of the plurality of sensing devices with respect to the at least one reference object based on the at least one magnitude of the at least one physical feature;
computing a high-accuracy absolute positioning of the mobile platform based on relative positioning of each of the plurality of sensing devices and the geolocation of at least one reference object, wherein said absolute positioning is a geolocation of said mobile platform including an elevation of the mobile platform, with an accuracy higher than said approximated geolocation of said mobile platform; and
outputting the high-accuracy absolute positioning of the mobile platform to at least one device deployed in said mobile platform for navigation and/or autonomous control of said mobile platform.

* * * * *